United States Patent
Kim (10) Patent No.: US 7,911,920 B2
(45) Date of Patent: *Mar. 22, 2011

(54) OPTICAL PICK-UP APPARATUS AND METHOD FOR MULTI-OPTICAL DISK TYPE RECORDING/REPRODUCING

(75) Inventor: Bong-gi Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1577 days.

This patent is subject to a terminal disclaimer.

(21) Appl. No.: 11/221,734

(22) Filed: Nov. 22, 2005

(65) Prior Publication Data

US 2006/0109772 A1     May 25, 2006

(30) Foreign Application Priority Data

Sep. 20, 2004    (KR) .................. 10-2004-0074941

(51) Int. Cl.
*G11B 7/00*     (2006.01)

(52) U.S. Cl. .......... 369/112.01; 369/112.04; 369/112.17

(58) Field of Classification Search ............ 369/112.01, 369/112.04, 112.05, 112.17
See application file for complete search history.

(56) References Cited

U.S. PATENT DOCUMENTS

| | | | | |
|---|---|---|---|---|
| 5,933,401 A * | 8/1999 | Lee et al. | .................. | 369/112.21 |
| 6,426,933 B1 * | 7/2002 | Jeong et al. | .............. | 369/112.17 |
| 6,507,009 B1 * | 1/2003 | Ohnishi et al. | ............. | 250/201.2 |
| 6,563,099 B2 * | 5/2003 | Kimura et al. | ............. | 250/201.5 |
| 7,126,883 B2 * | 10/2006 | Yamamoto et al. | ........ | 369/13.06 |
| 7,450,477 B2 * | 11/2008 | Kim et al. | .................. | 369/44.41 |
| 2002/0159378 A1 * | 10/2002 | Lee et al. | .................. | 369/112.12 |
| 2003/0179680 A1 * | 9/2003 | Park et al. | ................. | 369/112.04 |

FOREIGN PATENT DOCUMENTS

| | | |
|---|---|---|
| JP | 2002-312933 | 10/2002 |
| JP | 2004-5859 | 1/2004 |
| KR | 10-160204 | 8/1998 |
| KR | 2000-66666 | 11/2000 |
| KR | 2003-97328 | 12/2003 |

* cited by examiner

*Primary Examiner* — Wayne R Young
*Assistant Examiner* — Adam R Giesy
(74) *Attorney, Agent, or Firm* — Staas & Halsey LLP (57) ABSTRACT

An optical pick-up apparatus including an optical source module having a CD optical source and a DVD optical source, a diffracting grating dividing a light beam from the optical source module to at least three divided light beams, a first optical divider changing a path of the divided light beams to an optical disk, a second optical divider reflecting and forwarding the divided light beams reflected from the optical disk in a predetermined ratio, a first optical detector including a single optical sensor receiving reflected light from the second optical divider, and a second optical detector including at least three optical detection sensors receiving forwarded light from the second optical divider. Embodiments of the present invention can provide support for multi-type optical disks with a simple optical structure.

5 Claims, 6 Drawing Sheets

OPTICAL PICK-UP APPARATUS AND METHOD FOR MULTI-OPTICAL DISK TYPE RECORDING/REPRODUCING

CROSS-REFERENCE TO RELATED APPLICATIONS

This application claims benefit under 35 U.S.C. §119 (a) from Korean Patent Application No. 2004-74941, filed on Sep. 20, 2004, the entire content of which is incorporated herein by reference.

BACKGROUND OF THE INVENTION

1. Field of the Invention

Embodiments of the present invention relate to a pick-up apparatus and method for reproducing and/or recording data from/to a medium. More particularly, embodiments of the present invention relate to an optical pick-up apparatus and method for recording and reproducing data of various types of optical disks.

2. Description of the Related Art

Recently, various types of optical disks have been widely used for information storage. Accordingly, optical pick-up apparatuses have generally been manufactured to have the capability to record and/or reproduce data to/from more than two types of optical disks. Thus, it has been possible to record/reproduce data on a digital video disk (DVD) type optical disks such as a DVD-R, a DVD-RW, a DVD-RAM, for example, and a compact disk (CD) type optical disks such as a CD-R, a CD-RW and a CD-ROM, for example, by using the optical pick-up apparatus compatible with different optical disk types in a multi-type optical disk compatible optical pick-up apparatus.

However, it is very complicated to manufacture such a multi-type optical disk compatible optical pick-up apparatus because each type of optical disk has its own unique location of pits and/or gap between pits, for example. As a more particular example, the location of pits and the gap in DVD type optical disks may be completely different according to their type, such as DVD-R, DVD-RW, and DVD-RAM types, for example.

Figure 1:
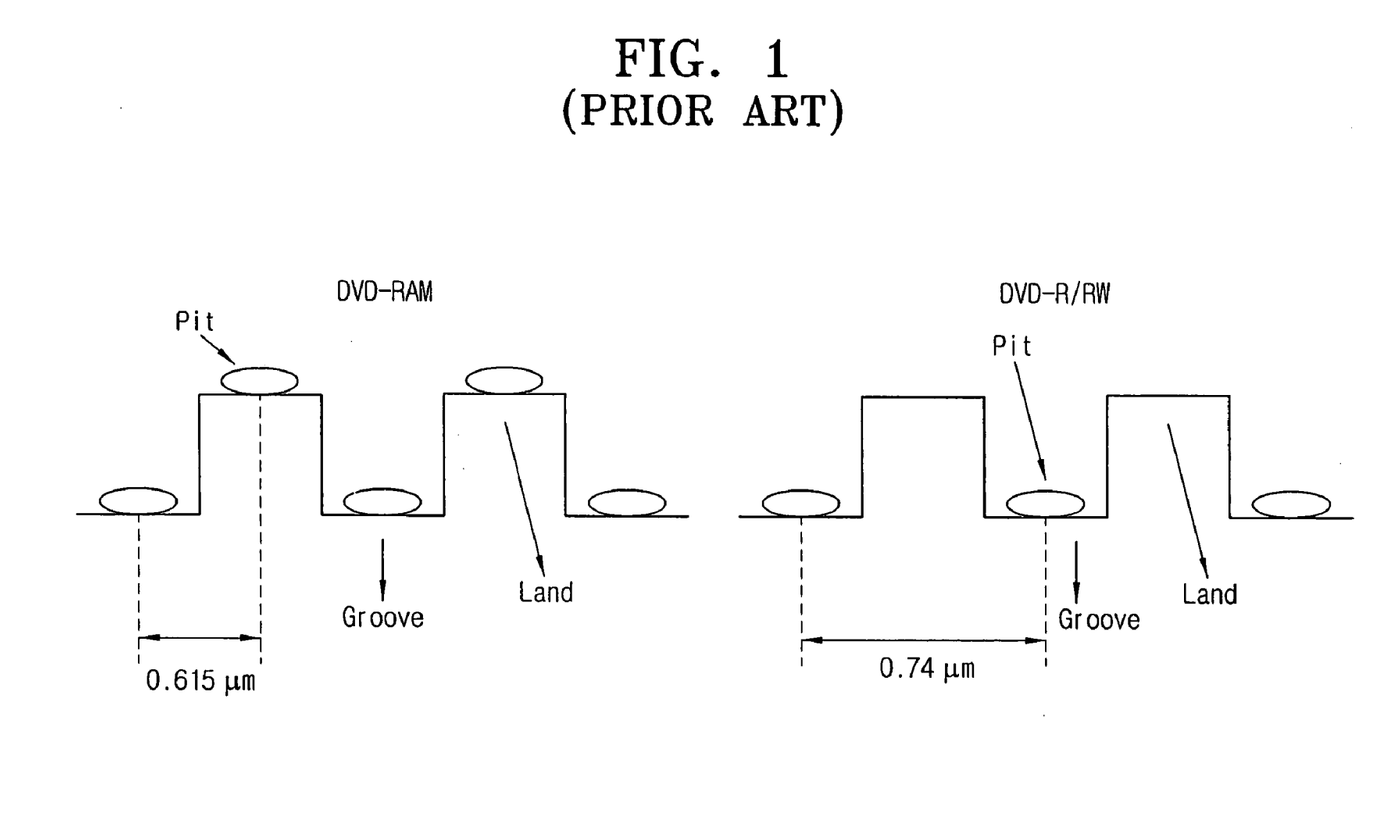
FIG. 1 illustrates a comparison between tracks in a DVD-RAM type optical disk and a DVD-R/RW type optical disk.

FIG. 1 illustrates a comparison between tracks in a DVD-RAM type optical disk and a DVD-R/RW type optical disk.

As shown in FIG. 1, pits can be formed on both a groove area and a land area in the DVD-RAM disk, with the gap between pits being 0.615 μm. Conversely, in the DVD-R/RW disks, the pits can be formed on only the groove area, with the gap between pits being 0.74 μm. Accordingly, a conventional multi-type optical disk compatible optical pick-up apparatus generally includes a hologram enabling the capability to support both the DVD-R/RW and DVD-RAM disks.

Figure 2:
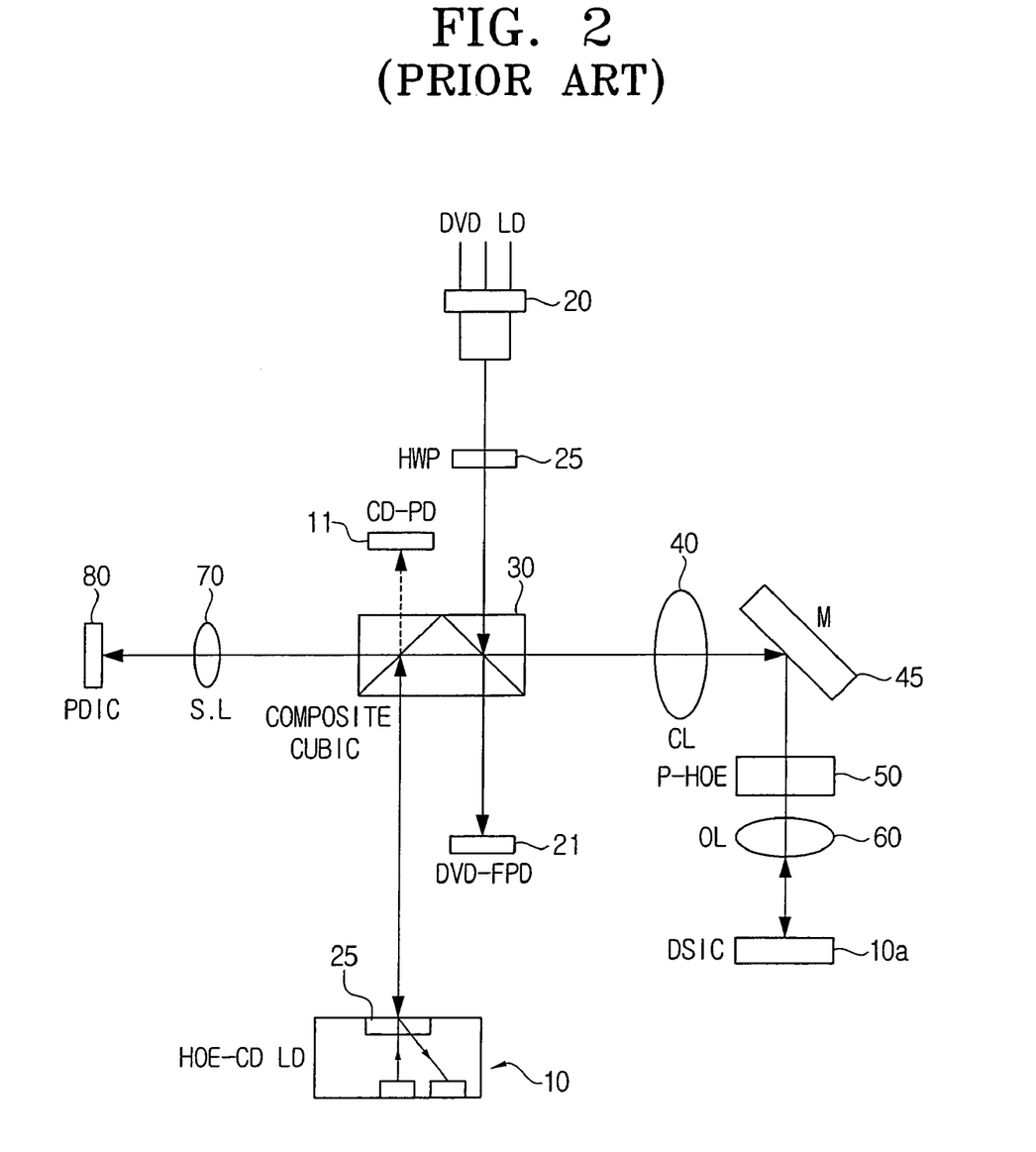
FIG. 2 illustrates a conventional multi-type optical disk compatible optical pick-up apparatus.

FIG. 2 illustrates a conventional multi-type optical disk compatible optical pick-up apparatus.

As shown in FIG. 2, the conventional multi-type optical disk compatible optical pick-up apparatus includes a first optical source 10 to output a light beam of 780 nm wavelength, a second optical source 20 to output a light beam of 650 nm wavelength, a ½ wavelength plate 25 to convert a P polarized light beam output from the first and the second optical sources 10 and 20 into S polarized light beams, a complex prism 30 to change the propagation path of the S polarized light beams from the first optical source 10 and the second optical source 20, a collimating lens 40 to convert the reflected light beam entered from the complex prism 30 to a parallelized light beam, a reflection mirror 45 to reflect the parallelized light beam; a polarized light hologram 50, an objective lens 60, a sensor lens 70 to concentrate the light beam reflected from an optical disk 10a and from the objective lens 60, the polarized light hologram 50, the reflection mirror 45, the collimating lens 40 and the complex prism 30, an optical detector 80 to receive and collect the light beam from the sensor lens 70, and front monitor photo diode 21 and photo diode 11.

For recording and/or reproducing data to/from various types of optical disks having different recording formats, the conventional multi-type optical disk compatible optical pick-up apparatus should include a specially manufactured polarized light hologram for beam dividing. The polarized light hologram 50 is thus specially produced to be operated by a light beam having a predetermined wavelength, e.g., 650 nm, polarized in a predetermined direction, e.g., P-polarized. However, it is very difficult to manufacture the polarized hologram 50 because the weight and size of the polarized hologram are limited. That is, the polarized hologram 50 must usually be manufactured to have less than 0.68 mm of thickness. However, the hologram produced with such a thin thickness may be tilted or bent by heat generated during the operating of the multi-type optical disk compatible optical pick-up apparatus and thus may generate faulty operation of the optical signal detection. Also, there may be an assembling common difference generated between the objective lens 60 and the polarized hologram 50 by including the polarized hologram 50, with the assembling common difference being difficult to eliminate.

As described above, the conventional multi-type optical disk compatible optical pick-up apparatus includes many complicated sub-elements. Therefore, various assembly processes are required to manufacture the conventional multi-type optical disk compatible optical pick-up apparatus, such that the complicated various assembly processes may result in inferior optical disk apparatuses.

In addition, the optical detector 80 generates a focus error (FE) signal and a tracking error (TE) signal for controlling a focus servo and a tracking servo by using a 3-beam method. For example, the FE signal can be generated by an astigmatism method and the TE signal can be generated by using a differential push pull (DPP) method for a DVD±R/RW optical disk type. Conversely, for the DVD-RAM type of optical disk, the optical detector 80 generates the FE signal by using the astigmatism method and the TE signal by using a push pull (PP) method.

However, when the FE signal is generated for focus servo control of DVD-RAM by using anastigmatic of a main light, noise may be generated by the forming of a pre-pit on the land track of the DVD-RAM type of optical disk. The noise causes inaccurate detection of focusing location. Accordingly, performance of the conventional multi-type optical disk compatible optical pick-up apparatus is degraded.

SUMMARY OF THE INVENTION

Accordingly, embodiments the present invention solve the above-mentioned and/or additional problems, with an aspect of the present invention being to provide a multi-type optical disk compatible optical pick-up apparatus having a simple optical structure, supporting various types of optical disks, having superior performance for recording and/or reproducing under high temperatures.

To achieve the above and/or other aspects and advantages, embodiments of the present invention include an optical pick-up apparatus for multi-recording/reproducing, including an optical source module including a CD optical source and a DVD optical source, a diffracting grating to divide a light beam output from the optical source module into at least three divided light beams, a first optical divider to change a propagation path of the divided light beams onto an optical disk, a second optical divider to reflect and forward the divided light beams reflected from the optical disk along a predetermined ratio, a first optical detector including a single optical sensor to receive one of the divided light beams as reflected from the second optical divider, and a second optical detector including at least three optical detection sensors for receiving one of the divided light beams as forwarded through the second optical divider.

The first optical divider and the second optical divider may be arranged in opposite directions along a predetermined inclination angle. In addition, the second optical divider may be one of a concave lens and a beam splitter with a coating for reflecting and forwarding light beams according to a predetermined ratio.

The first optical detector may obtain a focus error signal by using a beam size detection method for controlling a focus servo of a DVD-RAM type optical disk.

The optical pick-up apparatus may include an optic axis compensating hologram arranged before the second optical detector for concentrating light beams reflected from a CD type optical disk to the second optical detector on a predetermined location of the second optical detector.

To achieve the above and/or other aspects and advantages, embodiments of the present invention include an optical pick-up apparatus, including a DVD optical source, a diffracting grating to divide a light beam output from the DVD optical source into at least three light beams, a first optical divider to change a propagation path of the divided light beams to an optical disk, a second optical divider to reflect and forward the divided light beams reflected from the optical disk, along a predetermined ratio, a first optical detector including a single optical sensor to receive one of the divided light beams as reflected from the second optical divider, and a second optical detector including at least three optical detection sensors to receive one of the divided light beams as forwarded through the second optical divider.

The first optical detector may obtain a focus error signal by using a beam size detection method for controlling a focus servo of a DVD-RAM type optical disk. Further, the second optical detector may detect a tracking error signal by using a push pull method for controlling tracking servo of a DVD-RAM type optical disk.

To achieve the above and/or other aspects and advantages, embodiments of the present invention include a recording and/or reproducing apparatus including an optical pickup embodiment of the present invention.

To achieve the above and/or other aspects and advantages, embodiments of the present invention include a pick-up method, including generating a light beam, dividing the generated light beam into at least three light beams, changing a propagation path of the divided light beams toward a medium, selectively reflecting and forwarding the divided light beams reflected from the optical disk along a predetermined ratio, detecting one of the divided light beams as reflected from the selective reflecting of the divided light beams reflected from the optical disk, and detecting one of the divided light beams as forwarded by the selective forwarding of the divided light beams reflected from the optical disk.

The changing of the propagation path can be accomplished by a first optical divider and the selective reflecting and forwarding is accomplished by a second optical divider, with the first and second optical dividers being arranged in opposite directions along a predetermined inclination angle.

The second optical divider is one of a concave lens and a beam splitter with a coating reflecting and forwarding light according to a predetermined ratio.

Further, the detecting of divided light beams reflected from the selective reflecting may enable generation of a focus error signal by using a beam size detection method controlling a focus servo of a DVD-RAM type optical disk. Further, the detecting of divided light beams forwarded by the selective forwarding may enable generation of a tracking error signal by using a push pull method controlling tracking servo of a DVD-RAM type optical disk.

The generating of the light beam may further include generating the light beam compatible with a DVD type optical disk. Similarly, the generating of the light beam further may include generating a light beam compatible with a CD type optical disk, and the generating of the light beam further may still further include generating the generated light beam divided into at least three light beams, compatible with a DVD type optical disk.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to embodiments of the present invention, examples of which are illustrated in the accompanying drawings, wherein like reference numerals refer to the like elements throughout. The embodiments are described below to explain the present invention by referring to the figures.

Figure 3:
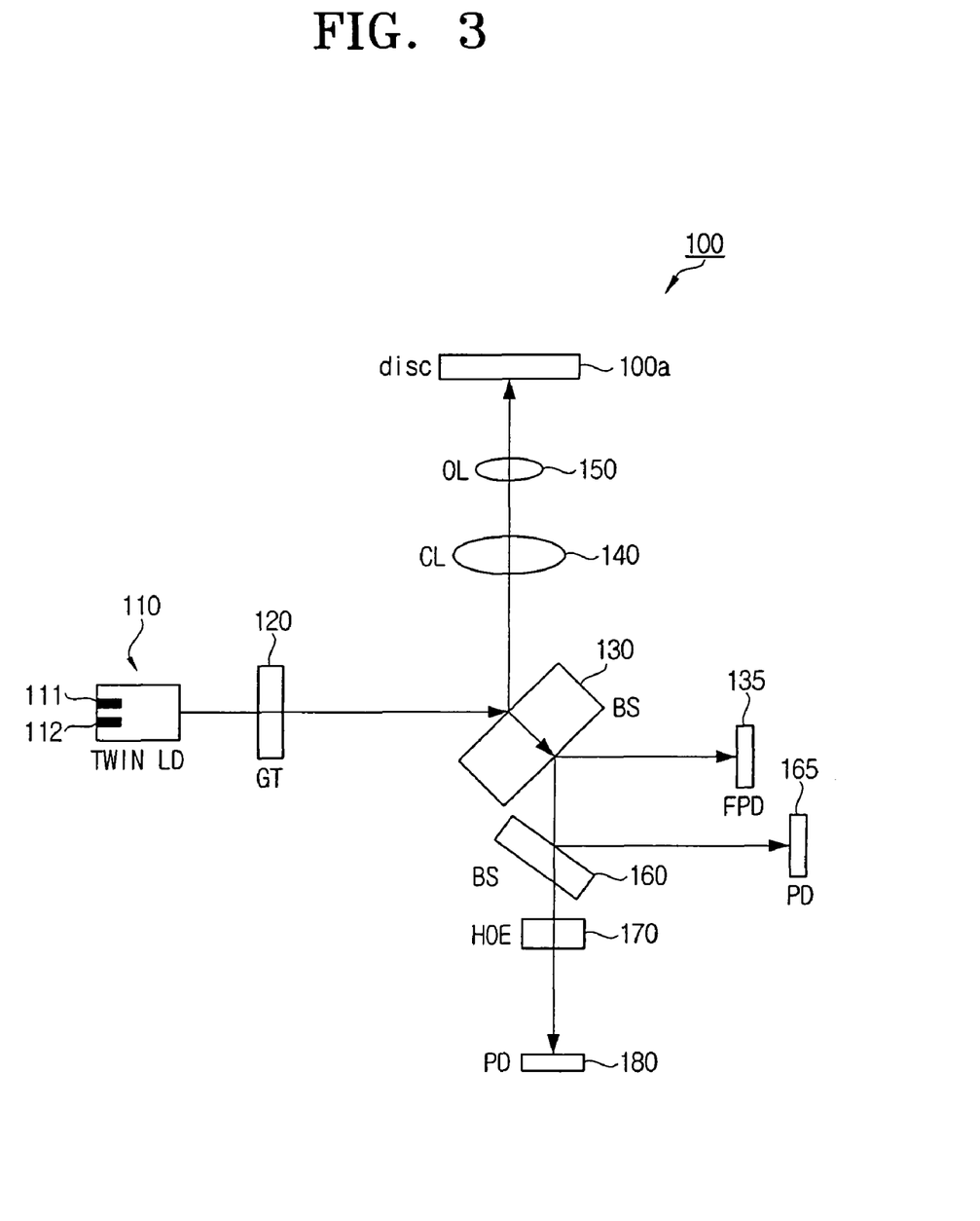
FIG. 3 illustrates a multi-type optical disk compatible optical pick-up apparatus, according to an embodiment of the present invention.

FIG. 3 illustrates a multi-type optical disk compatible optical pick-up apparatus, according to an embodiment of the present invention.

Referring to FIG. 3, a multi-type optical disk compatible optical pick-up apparatus 100 may include an optical source module 110, a grating 120, a first beam splitter 130, a front monitor photodiode (FPD) 135, a collimating lens 140, an objective lens 150, a second beam splitter 160, a first photodiode 165, an optical axial compensating hologram 170 and a second photodiode 180.

The multi-type optical disk compatible optical pick-up apparatus 100 can be included in an optical disk recording and/or reproducing device such as a compact disk player (CDP), a digital video disk player (DVDP), and a digital video disk recorder (DVDR), for example. The multi-type optical disk compatible optical pick-up apparatus 100 may record data on an optical disk 100a and output an electric signal by reading and converting the data recorded on the optical disk 100a.

The optical pick-up apparatus 100 may support a DVD type optical disk, including a DVD±R, a DVD±RW, a DVD-RAM, and a DVD-ROM, for example, and a CD type optical disk, including a CD-R, a CD-RW and a CD-ROM, for example. That is, the optical pick-up apparatus 100 may record and/or reproduce data to/from the DVD type optical disk and the CD type optical disk. Specially, the optical pick-up apparatus 100 may record and/or reproduce data to/from both the DVD-R/RW and the DVD-RAM optical disk types.

The optical source module 110 can include a DVD optical source 111 to output a light beam of 650 nm wavelength and a CD optical source 112 to output a light beam of 780 nm wavelength. A twin laser diode (LD) may be used in the optical source module 110. The optical source module 110, alternatively, may operate one of the DVD optical source 111 and the CD optical source 112 according to the type of optical disk present.

The grating 120 can divide the light beam from the optical source module 110 into at least three light beams (hereinafter referred to as 3-beams). That is, the light beam from the optical module 110 can be divided into $0^{th}$ light beam, straightly propagated by a diffracting groove formed on the grating 120, and into $±1^{st}$ order light beams propagating along predetermined diffracting angles by diffracting grooves formed on the grating 120.

The first beam splitter 130 reflects a predetermined part of the 3-beams, from the grating 120, and forwards the remaining part of the 3-beams based on a predetermined ratio. Accordingly, the forwarded part of the 3-beams is forwarded to the FPD 135 and the reflected part of the 3-beams is forwarded to the collimating lens 140.

The FPD 135 detects the amount of light from the first beam splitter 130 and controls the strength of the light beam output from the DVD optical source 111 or the CD optical source 112.

The collimating lens 140, parallelizing light, can forward the light beam diffracted from the first beam splitter 130.

The objective lens 150 forms an optical spot on a recording side of the optical disk 100a by concentrating the 3-beams from the collimating lens 140.

The light beam reflected from the optical disk 100a is forwarded to the second beam splitter 160 through the objective lens 150, the collimating lens 140, and the first beam splitter 130.

The second beam splitter 160 reflects and forwards the 3-beams within a predetermined ratio. Accordingly, a forwarded part of the 3-beams is forwarded to the optic axis compensating hologram 170 and a reflected part of the 3 beams is forwarded to the first optical detector 165. The second beam splitter 160 of the present invention can be arranged along an opposite direction of the first beam splitter 130 with a predetermined inclined angle, e.g., 45°. Therefore, coma aberration generated by the first beam splitter 130 can be eliminated. Meanwhile, as an example, a reflection coated concave lens may be used instead of using the second beam splitter 160.

Figure 4A:
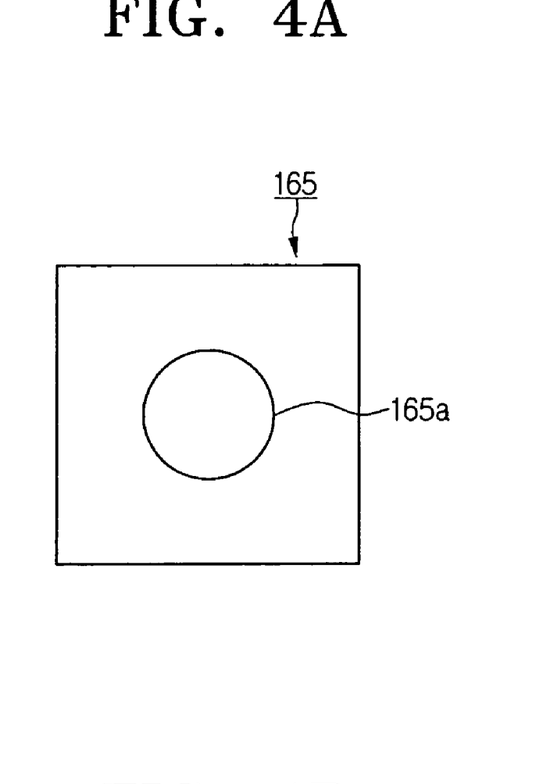
FIGS. 4A and 4B illustrate first optical detectors, such as the first optical detector of FIG. 3, according to embodiments of the present invention.
Figure 4B:
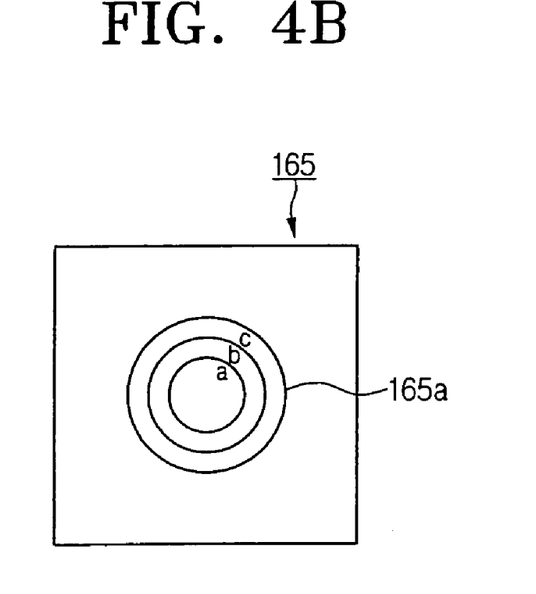

The first optical detector 165 can receive the reflected part of 3-beams from the second beam splitter 160. That is, the first optical detector 165 may receive the center light. For receiving the center light, the first optical detector 165 may include a photodiode 165A, as shown in FIG. 4A, and may also be embodied to have a form divided to 3 regions a, b, and c, as shown in FIG. 4B, as another example.

The first optical detector 165 can be used to detect a focus error (FE) signal for controlling focus servo of the DVD-RAM disk by detecting a size of the beam spot of light beam forwarded to the photodiode 165A.

The optic axis compensating hologram 170 can be arranged between the second beam splitter 160 and the second optical detector 180, and can be manufactured to be operated by a light beam having a predetermined wavelength, e.g., 650 nm. The optic axis compensating hologram 170 can change the propagation path of the light beam reflected from a CD type optical disk to a predetermined location on the second optical detector 180. Embodiments of the present invention include the twin LD having the DVD optical source 111 and the CD optical source 112, arranged to be separated within a predetermined area i.e., 110 μm, with optical sub-elements being arranged based on the optical axis of the light beam output from the DVD optical source 111.

The second optical detector 180 can receive the light beam reflected from the optical disk 100a and convert the reflected light to an electric signal. The second optical detector 180 can include three photodiodes, for examples, divided along predetermined areas for receiving and collecting the 3-beams from the optic axis compensating hologram 170.

Figure 5A:
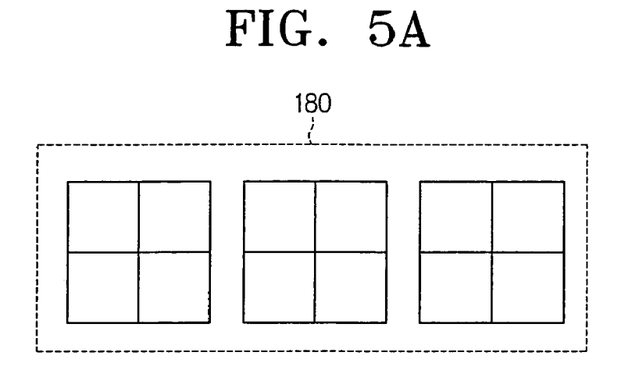
FIGS. 5A to 5C illustrate second optical detectors, such as the second optical detector of FIG. 3, according to embodiments of the present invention.
Figure 5B:
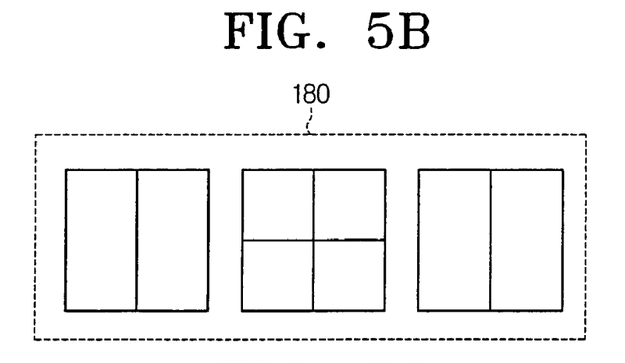
Figure 5C:
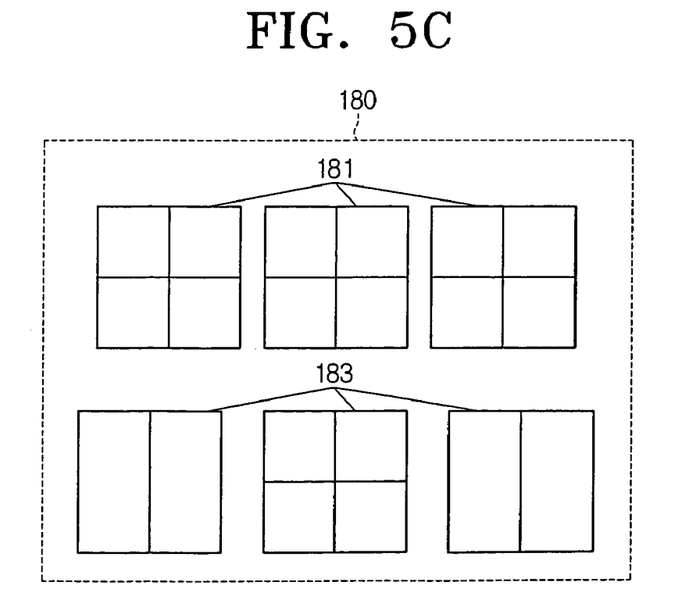

FIGS. 5A to 5C illustrate a second optical detector, such as that shown in FIG. 3, according to an embodiment of the present invention.

The second optical detector 180 may include a single photodiode for both of the CD type optical disk and the DVD type optical disk, as shown in FIGS. 5A and 5B, or may include two independent photodiodes, 181 and 182, respectively one for the CD type optical disks and the other for the DVD type optical disks, as shown in FIG. 5C.

A signal detected at each photodiode included in the second optical detector 180 can be used for obtaining a FE signal and a TE (Tracking Error) signal in order to control focus servo and tracking servo of the CD type DVD type optical disks, including the DVD±R/RW and DVD-ROM types. Also, the detected signal can be used for obtaining TE signal for controlling tracking servo of DVD-RAM type of optical disk.

The optical disk 100a may have unique thicknesses, with lengths of pits and pit spacing according to each optical disk type. Therefore, focus servo and tracking servo can be differently controlled according to the optical disk type of the optical disk 100a. Therefore, if the optical disk 100a is of the DVD ROM type, the FE signal can be generated by the astigmatism detection method and the TE signal can be generated by the DPD (differential push detection) method. If the optical disk 100a is of the DVD±R/RW type, the FE signal can be generated by the astigmatism detection method and the TE signal can also generated by the DPP (differential push pull) method. Further, if the optical disk 100a is of a DVD-RAM type, the FE signal can be generated by a spot size detection method and the TE signal can be generated by a PP (push pull) method.

Meanwhile, if the optical disk 100a is a CD type optical disk and the optical pick-up apparatus is in a recording mode, for recording data on the CD type optical disk, the FE signal may be generated by the astigmatism detection method and the TE signal may be generated by the DPP method, for example.

Figure 6:
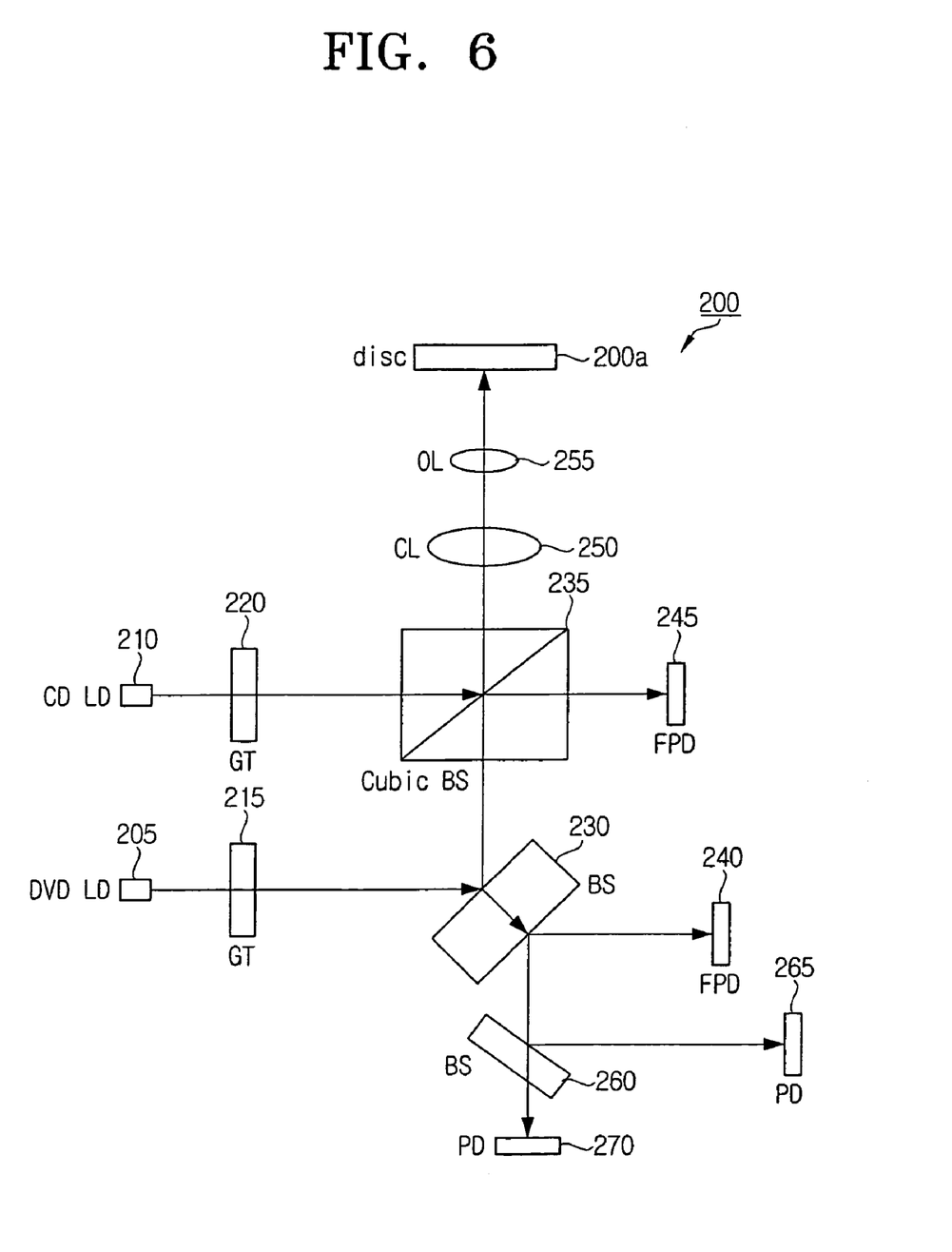
FIG. 6 illustrates a multi-type optical disk compatible optical pick-up apparatus, according another embodiment of the present invention.

FIG. 6 illustrates a multi-type optical disk compatible optical pick-up apparatus, according to another embodiment of the present invention.

As shown in FIG. 6, a multi-type optical disk compatible optical pick-up apparatus 200 may include a DVD optical source 205, a CD optical source 210, a DVD diffraction grating 215, a CD diffraction grating 220, a first beam splitter 230, a second beam splitter 235, a third beam splitter 260, a DVD FPD 240, a CD FPD 245, a collimating lens 250, an objective lens 255, a first optical detector 265 and a second optical detector 270.

The multi-type optical disk compatible optical pick-up apparatus 200 may include two independent optical sources, the DVD optical source 205 and the CD optical source 210, for example. Accordingly, the multi-type optical disk compatible optical pick-up apparatus 200 may respectively also include two gratings 215 and, 220, two beam splitters 230 and 235 and two FPDs 240 and 245 for the two independent optical sources 205 and 210. As shown in FIG. 6, an optic axis compensating hologram is not required for compensating the optical axis.

Meanwhile, the collimating lens 250, the objective lens 255, the third beam splitter 260, the first optical detector 265 and the second optical detector 270 may operate similarly to the collimating lens 140, the objective lens 150, the second beam splitter 160, the first optical detector 165 and the second optical detector 180 of FIG. 3. Therefore, detailed explanations of the collimating lens 250, the objective lens 255, the third beam splitter 260, the first optical detector 265 and the second optical detector 270 are further omitted herein.

The DVD diffraction grating 215 may be manufactured to be operated by a light beam from the DVD optical source 205, and the CD diffraction grating 220 may be manufactured to be operated by a light beam from the CD optical source 210. However, operation principles thereof may be similar to the grating 120 shown in FIG. 3. Therefore, further detailed explanations about the DVD diffraction grating 215 and the CD diffraction grating 220 are also omitted.

Hereinafter, operations for recording data on the DVD-RAM disk are explained, as an example of the present invention.

The DVD optical source 205 outputs a light beam of 650 nm wavelength and the DVD diffraction grating 215 divides the light from the DVD optical source 205 into three light beams (hereinafter 3-beams). The 3-beams are reflected by the first beam splitter 230 and the reflected 3-beams are forwarded to the optical disk, while passing through the second beam splitter 235, the collimating lens 250, and the objective lens 255. The 3-beams are reflected by a surface of the optical disk 200a, with the reflected 3-beam being forwarded to the third beam splitter 260, through the objective lens 255, the collimating lens 250, the second beam splitter 235, and the first beam splitter 230.

The third beam splitter 260 reflects and forwards the 3-beams according to a predetermined ratio. The reflected light beam, among the 3-beam, is forwarded to the first optical detector 265 and the forwarded light beam, among the 3-beams, is forwarded to the second optical detector 270.

The first optical detector 265 receives the reflected light beam and collects the center light from the reflected light beam. The first optical detector 265 then converts the center light to an electric signal. The electric signal can then be used to obtain the FE signal in order to control focus servo for a DVD-RAM disk.

The second optical detector 270 can receive and convert the forwarded light beam into an electric signal. The electric signal can then be used for obtaining the TE signal in order to control tracking servo of DVD-RAM disk.

As mentioned above, a multi-type optical disk compatible optical pick-up apparatus, according to embodiments of the present invention, can include an optical detector for the DVD-RAM disk focusing. Therefore, embodiments of the present invention can be used both for the DVD-R/RW type optical disk and the DVD-RAM type optical disk. Furthermore, an optical structure for embodiments of the present invention can be simplified by using two wavelengths single laser diode. Therefore, embodiments of the present invention have advantages over conventional systems by having easy assembly, low costs through reduced optical sub-elements, and superior performance for recording/reproducing signals under high temperatures.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical pick-up apparatus for multi-recording/reproducing, comprising:
   an optical source module comprising a CD optical source and a DVD optical source;
   a diffracting grating to divide a light beam output from the optical source module into at least three divided light beams;
   a first optical divider to change a propagation path of the divided light beams onto an optical disk;
   a second optical divider to reflect and forward the divided light beams reflected from the optical disk along a predetermined ratio;
   a first optical detector comprising a single optical sensor to receive one of the divided light beams as reflected from the second optical divider; and
   a second optical detector comprising at least three optical detection sensors for receiving one of the divided light beams as forwarded through the second optical divider,
   wherein the first optical divider and the second optical divider are arranged in opposite directions along a predetermined inclination angle,
   wherein the first optical detector obtains a focus error signal by using a beam size detection method for controlling a focus servo of a DVD-RAM type optical disk.

2. An optical pick-up apparatus for multi-recording/reproducing, comprising:
   an optical source module comprising a CD optical source and a DVD optical source;
   a diffracting grating to divide a light beam output from the optical source module into at least three divided light beams;
   a first optical divider to change a propagation path of the divided light beams onto an optical disk;
   a second optical divider to reflect and forward the divided light beams reflected from the optical disk along a predetermined ratio;
   a first optical detector comprising an optical sensor to receive one of the divided light beams as reflected from the second optical divider; and
   a second optical detector comprising at least three optical detection sensors for receiving one of the divided light beams as forwarded through the second optical divider,
   wherein the first optical divider and the second optical divider are arranged in opposite directions along a predetermined inclination angle, further comprising:

an optic axis compensating hologram arranged before the second optical detector for concentrating light beams reflected from a CD type optical disk to the second optical detector on a predetermined location of the second optical detector.

3. An optical pick-up apparatus, comprising:

a DVD optical source;

a diffracting grating to divide a light beam output from the DVD optical source into at least three light beams;

a first optical divider to change a propagation path of the divided light beams to an optical disk;

a second optical divider to reflect and forward the divided light beams reflected from the optical disk along a predetermined ratio;

a first optical detector comprising an optical sensor to receive one of the divided light beams as reflected from the second optical divider; and a second optical detector comprising at least three optical detection sensors to receive one of the divided light beams as forwarded through the second optical divider, wherein the first optical divider and the second optical divider are arranged in opposite directions along a predetermined inclination angle, wherein the first optical detector obtains a focus error signal by using a beam size detection method for controlling a focus servo of a DVD-RAM type optical disk.

4. The optical pick-up apparatus of claim 3, wherein the second optical detector detects a tracking error signal by using a push pull method for controlling tracking servo of a DVD-RAM type optical disk.

5. A pick-up method, comprising:

generating a light beam;

dividing the generated light beam into at least three light beams;

changing a propagation path of the divided light beams toward a medium;

selectively reflecting and forwarding the divided light beams reflected from the medium along a predetermined ratio;

detecting one of the divided light beams as reflected from the selective reflecting of the divided light beams reflected from the medium; and detecting one of the divided light beams as forwarded by the selective forwarding of the divided light beams reflected from the medium, wherein the changing of the propagation path is accomplished by a first optical divider and the selective reflecting and forwarding is accomplished by a second optical divider, with the first and second optical dividers being arranged in opposite directions along a predetermined inclination angle, wherein the detecting of divided light beams reflected from the selective reflecting enables generation of a focus error signal by using a beam size detection method controlling a focus servo of a DVD-RAM type optical disk.

* * * * *